Sept. 23, 1952         K. SONDEREGGER                2,611,346
            AIR DUCT MEANS FOR AIR-COOLED
            INTERNAL-COMBUSTION ENGINES
                Filed March 10, 1948
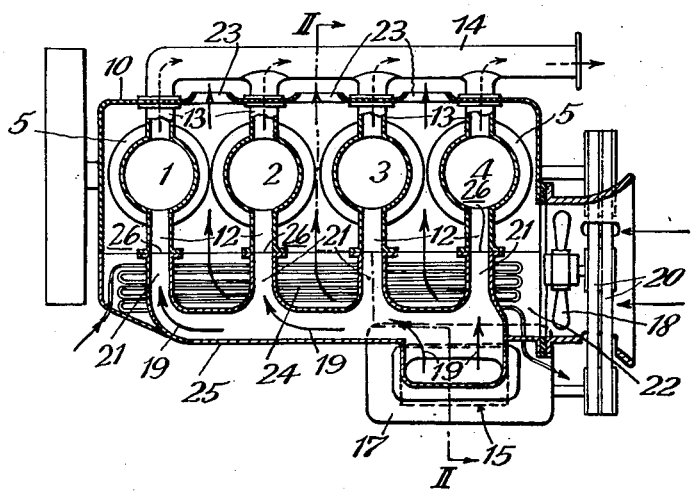
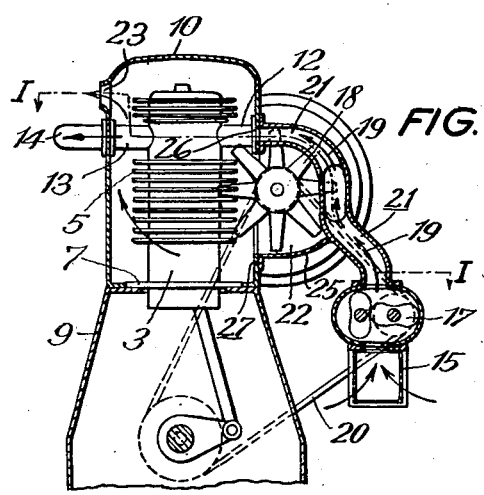
INVENTOR:
Konrad Sonderegger
by Sommers & Young
     Attorneys Patented Sept. 23, 1952

2,611,346

UNITED STATES PATENT OFFICE 2,611,346

AIR-DUCT MEANS FOR AIR-COOLED INTERNAL-COMBUSTION ENGINES

Konrad Sonderegger, Winterthur, Switzerland, assignor to Schweizerische Lokomotiv- und Maschinenfabrik, Winterthur, Switzerland Application March 10, 1948, Serial No. 14,038
In Switzerland March 14, 1947

2 Claims. (Cl. 123—41.7)

My invention relates to improvements in ducting-means for supplying combustion-air as well as cooling-air to an internal combustion engine; and the main object of my improvements is to provide a one-piece cowl flanged to the motor block and which comprises the ducts for the combustion air as well as those for the cooling-air.

I attain this and related objects by the arrangement illustrated, in one form of invention, in the accompanying drawing, in which:

Fig. 1 shows a horizontal section, on the line I—I of Fig. 2, through the air-cooled motor, and Fig. 2 a cross-section thereof on the broken line II—II of Fig. 1.

The represented in-line engine comprises four cylinders 1–4 which are equipped with cooling-fins 5 for air-cooling. Each cylinder is screwed down onto the block 9 by means of a flange 7, and is surrounded by a jacket 10 which is fixedly secured to the block 9 and serves for guiding the cooling-air. The combustion air enters into the cylinders through four intake pipe connections 12, and the exhaust gases leave the cylinders through the four pipe connections 13 into the manifold 14. The combustion air is supplied by the radial cylinder blower 17, and the cooling-air by the blower 18. The two blowers are driven from the motor shaft through a V-belt 20. The combustion air is sucked by the blower 17 through the air filter 15, and flows through the ducts 21, in direction of the arrows 19, into the four cylinder-intakes 12. The cooling-air is delivered by the blower 18 into the chamber 22, formed within a cowl 25 which is flanged to the jacket 10. The chamber 22 opens into the space surrounding the cylinders 1 within the jacket 10, so that the cooling air entering into the chamber 22 flows over the cylinder fins 5 and is discharged through the three exit apertures 23. The pipe coils of a cooler 24 for the motor lubricating oil are housed in the chamber 22. The said ducts 21 are housed in the cowl 25 which also is provided for conducting the cooling-air, and are bolted down onto the motor block together with the said cowl. The ducts 21 form together with the cowl 25 a single casting, the ducts extending internally along the wall of the cowl, thus leaving within the cowl sufficient free space for the passage of the cooling air. The separating faces 26 between the flanges of the ducts 21 and those of the air-intakes 12 of all the cylinders, as well as the separating faces 27 between the cowl 25 and the jacket 10, are all situated in the same vertical plane.

When no supercharger 17 is provided for, the filter 15 obviously may be directly secured to the cowl 25, and the air then also is conducted in direction of the arrows 19 (Fig. 1) into the intake pipe connections 12.

What I claim as new, and desire to secure by Letters Patent, is:

In the claims:

1. In a multi-cylinder, air-cooled internal combustion engine having its cylinders arranged in-line, said engine having a cowl extending laterally along the cylinders for delivering cooling air to the cylinders, and combustion air ducts connected to each cylinder, said air ducts extending internally of the cowl along the wall thereof and being integral with the cowl to form a single casing flanged to the engine, the flange surfaces being all situated in a single plane.

2. In a multi-cylinder, air-cooled internal combustion engine having its cylinders arranged in-line, said cylinders being provided with cooling fins, a jacket surrounding the cylinders for guiding cooling air along said fins, a cowl extending laterally along the engine and flanged to the jacket, a blower for delivering cooling air through said cowl and into said jacket, combustion air ducts flanged to each cylinder, said air ducts being formed integrally with the cowl and extending internally along the wall thereof to provide for an unobstructed passage of cooling air through said cowl, the flange joints between said combustion air ducts and the cylinders and the flange joints between the cowl and said jacket being all situated in a single plane.

KONRAD SONDEREGGER.

REFERENCES CITED

The following references are of record in the file of this patent:

UNITED STATES PATENTS

| Number | Name | Date |
|---|---|---|
| 2,271,059 | Boulton et al. | Jan. 27, 1942 |
| 2,289,959 | Gregory | July 14, 1942 |
| 2,321,097 | Mills | June 8, 1943 |
| 2,334,561 | Kopplin | Nov. 16, 1943 |
| 2,374,412 | Caldwell | Apr. 24, 1945 |
| 2,407,223 | Caldwell | Sept. 10, 1946 |